United States Patent
Lee

(10) Patent No.: US 7,269,108 B2
(45) Date of Patent: Sep. 11, 2007

(54) DISC PLAYER AUTOMATICALLY EJECTING DISC AND METHOD THEREOF

(75) Inventor: Kyu-sang Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 10/717,599

(22) Filed: Nov. 21, 2003

(65) Prior Publication Data
US 2004/0100884 A1 May 27, 2004

(30) Foreign Application Priority Data
Nov. 26, 2002 (KR) .................. 10-2002-0074110

(51) Int. Cl.
*G11B 15/05* (2006.01)
(52) U.S. Cl. .................................... 369/47.36
(58) Field of Classification Search ............ 369/47.36, 369/30.32; 360/99.06; 720/636; 386/46; *G11B 15/05, G11B 7/085, 17/04, 17/03; H04N 5/781, H04N 5/07*
See application file for complete search history.

(56) References Cited

U.S. PATENT DOCUMENTS

| | | | |
|---|---|---|---|
| 4,679,182 A * | 7/1987 | Kamoshita et al. | ......... 720/661 |
| 4,701,902 A | 10/1987 | Aoyagi et al. | |
| 4,887,254 A | 12/1989 | Nakatsu et al. | |
| 5,109,414 A * | 4/1992 | Harvey et al. | ............... 725/135 |
| 5,228,014 A * | 7/1993 | d'Alayer de Costemore d'Arc | ...................... 369/30.27 |
| 5,438,674 A | 8/1995 | Keele et al. | |
| 5,506,828 A | 4/1996 | Kanno et al. | |
| 5,524,104 A | 6/1996 | Iwata et al. | |
| 5,673,244 A | 9/1997 | Choi | |
| 5,903,454 A * | 5/1999 | Hoffberg et al. | ............... 700/83 |

FOREIGN PATENT DOCUMENTS

| | | |
|---|---|---|
| JP | 2000-182293 | 6/2000 |
| KR | 1996-0002152 | 2/1996 |

OTHER PUBLICATIONS

Korean Publication No. 1998-4643 dated Mar. 30, 1998 (Abstract with p. 1 of 4).
Korean Publication No. 1998-4644 dated Mar. 30, 1998 (Abstract with p. 1 of 4).

* cited by examiner

*Primary Examiner*—A M Psitos
(74) *Attorney, Agent, or Firm*—Staas & Halsey LLP

(57) ABSTRACT

A disc drive, and method of automatically ejecting a disc from a disc player. The method comprises selecting a main title from a plurality of titles recorded on the disc and storing a playback time of the main title in a memory, and determining whether the main title is playing, or has played, back. Upon determining that the main title is playing or has played back, the playback time of the main title is compared with a time required for playback of the main title stored in the memory and determining whether playback of the main title has terminated. Upon determining that playback of the main title is terminated, the disc is ejected by driving an unloading device.

10 Claims, 2 Drawing Sheets

DISC PLAYER AUTOMATICALLY EJECTING DISC AND METHOD THEREOF

CROSS-REFERENCE TO RELATED APPLICATIONS

This application claims the benefit of Korean Patent Application No. 2002-74110, filed on Nov. 26, 2002, in the Korean Intellectual Property Office, the disclosure of which is incorporated herein by reference.

BACKGROUND OF THE INVENTION

1. Field of the Invention

The present invention relates to a disc drive, and more particularly, to a method of automatically ejecting a disc from a disc player.

2. Description of the Related Art

In the prior art, apparatuses automatically ejecting a tape if a program has terminated have been described. The apparatuses automatically ejecting a tape determine whether playback of the tape has terminated by counting the number of circulations of a supply reel and a take-up reel, or by detected tension and operating an unloading device when playback of the tape has terminated, thereby automatically ejecting the tape.

However, there are not methods or apparatuses for automatically ejecting a disc when playback of a certain title has terminated. In a conventional disc player, ejection of a disc is performed either by using an eject button installed in the disc player or by driving an unloading device in a case of emergency. Whether a program has terminated, or not, on a disc in a disc player cannot be determined as with a tape. The desires of the user can be fulfilled only by using an eject button.

Applications related to an apparatus for ejecting a disc using an eject button, such as U.S. Pat. Nos. 4,887,254, 4,701,902, 5,506,828, 5,438,674, 5,673,244, and 5,524,104 and Korean Patent Publication Nos. 1998-4643 and 1998-4644, have been published.

However, these applications only describe apparatuses ejecting a driven disc using an eject button.

For compact discs, e.g., CD-ROMs, VIDEO-CDs, and DVDs, on which a title, or titles, are recorded, it is desirable to automatically eject a disc after playback of a designated title has terminated. As used herein, "title" refers to a segment of information recorded on the disc, for example, a movie recorded on a DVD.

In addition, in places of business, such as DVD viewing stores, whose number is increasing in the marketplace, an apparatus or method informing an employee whether a title being viewed has terminated is required in order to facilitate the circulation of customers. For example, in a DVD viewing store, DVD players are mounted at the front counter, and a title played back on a DVD player can be viewed in a room assigned to the respective DVD player that is mounted at the front counter. However, current players and methods do not inform an employee operating the players at the counter whether the title being viewed has terminated. Thus, even though the playback of the title being viewed has terminated, the termination cannot be recognized at the counter.

As a result, it is not easily known when the customers, who are in a room in which a title being viewed has terminated, should leave, and when new customers should enter. Thus, it is difficult to increase profits by increasing the circulation of customers.

SUMMARY OF THE INVENTION

The present invention provides a disc player, and a method, of automatically ejecting a disc from the disc player, if playback of a title has terminated playing back the disc on which the title is recorded.

According to an aspect of the present invention, a method of ejecting a disc from a disc player is provided, comprising selecting a main title from a plurality of titles recorded on the disc and storing a playback time of the main title in a memory, and determining whether the main title is being played back. Upon determining that the main title is being played, the playback time of the main title is compared with a time required for playback of the main title stored in the memory and determining whether playback of the main title is terminated. Upon determining that playback of the main title is terminated, the disc is ejected by driving an unloading device.

Here, the playback time of each title is calculated by referring to respective program chain information of each title. The main title is the title having the longest playback time among the titles recorded on the disc.

According to another aspect of the present invention, a method is provided of ejecting a disc in a disc player, comprising selecting a main title from a plurality of titles recorded on the disc, and determining whether the main title is played back. Upon determining that the main title is played back, determining whether a post command is played back by referring to program chain information of the main title, and upon determining that the post command is played back, ejecting the disc by driving an unloading device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more readily appreciated from the following description of the embodiments, taken in conjunction with the accompanying drawings of which.

DETAILED DESCRIPTION OF THE INVENTION

Figure 1:
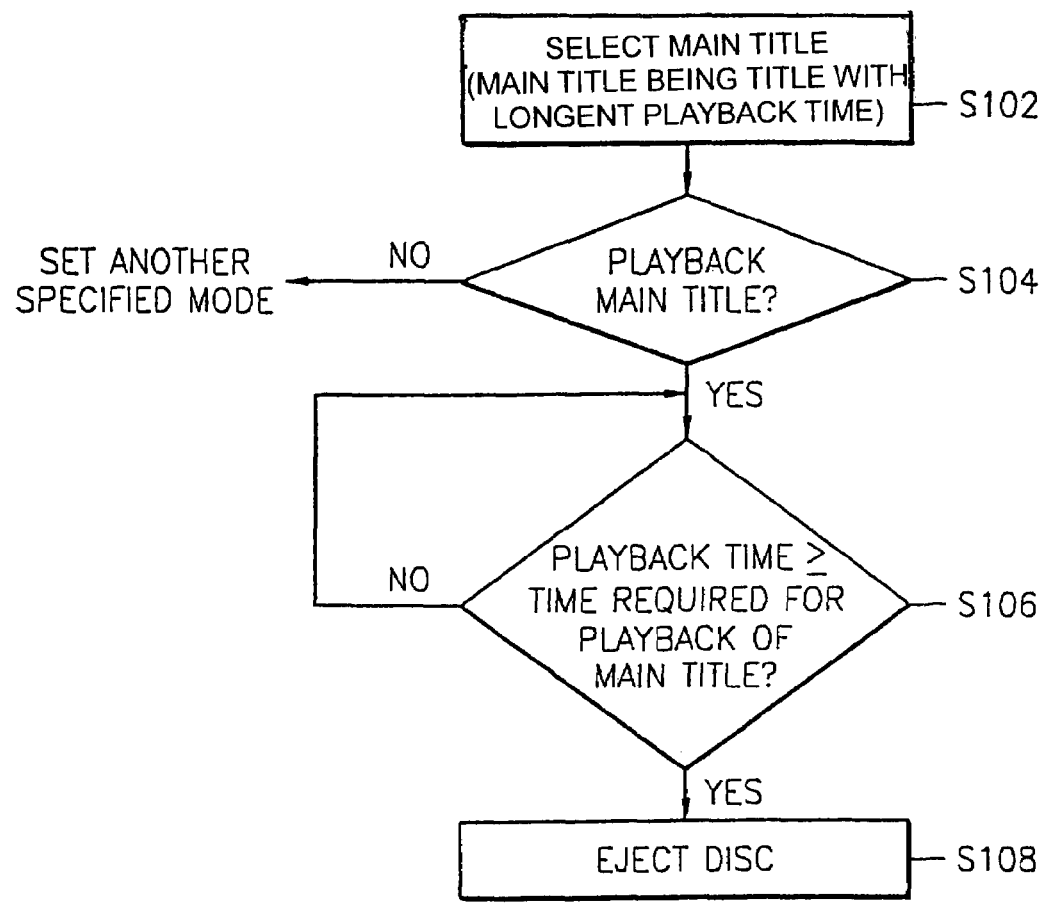
FIG. 1 is a flowchart illustrating a method of automatically ejecting a disc from a disc player according to an embodiment of the present invention.

Reference will now be made in detail to the embodiments examples of which are illustrated in the accompanying drawings, wherein like reference numerals refer to the like elements throughout. The embodiments are described below to explain the present invention by referring to the figures.

A method of automatically ejecting a disc from a disc player, according to an aspect of the present invention, is characterized in that whether a main title is playing, or has, played back is determined, and if playback of the main title has terminated, the disc is automatically ejected.

As used herein, a main title is a title having the longest playback time among titles recorded on a disc.

FIG. 1 is a flowchart illustrating a method of automatically ejecting a disc from a disc player according to an aspect of the present invention.

First, in operation S102, a main title is selected from a plurality of titles recorded on a disc. If the disc is loaded into a disc player, the disc player selects the main title by referring to program chain information.

In general, a subtitle, or subtitles, such as CF (Computer Files) and NG (Not Good i.e., out takes) are recorded on a disc in addition to the main title. The disc should not be automatically ejected when playback of the subtitle has terminated, and thus, the main title and the subtitle should be discriminated from each other.

The main title is selected as the title having the longest playback time among a plurality of titles recorded on the disc.

A playback time necessary for playing back each title is recognized from program chain (PGC) information of each title.

Next, in operation S104, whether the main title is playing, or has played back is determined. Upon determining that the main title is not playing, or has not played back, another specified mode is set.

Upon determining that the main title is playing, or has played back, in operation S106, a time since playback began is compared with a time required for playback of the main title as stored in a memory, and whether playback of the main title has terminated is determined.

Upon determining that playback of the main title has terminated, in operation S108, the disc is ejected by driving an unloading device.

Figure 2:
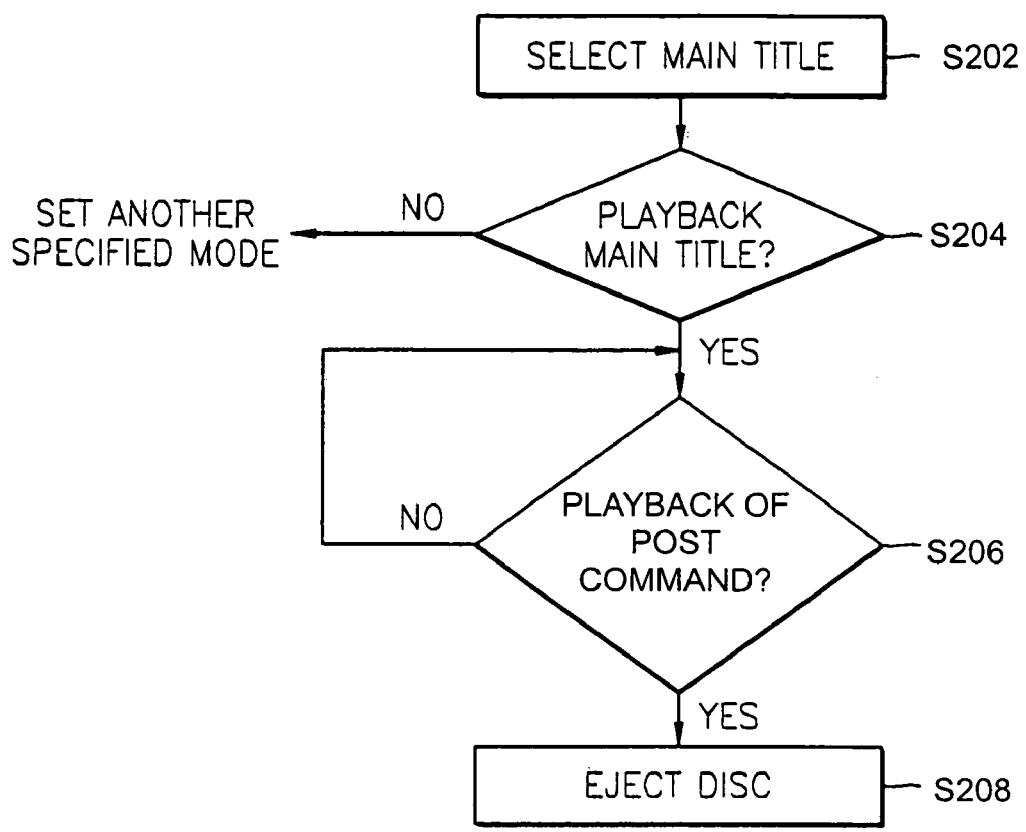
FIG. 2 is a flowchart illustrating a method of automatically ejecting a disc from a disc player according to another embodiment of the present invention.

FIG. 2 is a flowchart illustrating a method of automatically ejecting a disc from a disc player according to another embodiment of the present invention.

First, in operation S202, a main title is selected from a plurality of titles recorded on a disc.

Next, in operation S204, whether the main title is playing, or has played back is determined. Upon determining that the main title is not playing, or has played back, another specified mode is set.

In operation S206, whether playback of the main title is terminated is determined by detection of play back of a post command.

Whether playback of the main title has terminated is determined by detecting instructions to instruct each title to return to a main menu. A DVD is designed to select each title using a menu. For this purpose, a navigation command instructing each title to return to the main menu is recorded at the end of each title.

For example, while a movie title is the prevailing portion of a DVD title, a music title and a project title may have been produced as well as a movie title. In the case of the movie title, the simplest movie has a structure in which chapters are sequentially authored starting from a warning phrase and menus such as audio, subtitle, and chapter, are selected. This structure may not be desired because a warning phrase or a logo is continuously displayed whenever a movie is played back. However, the movie having this structure can be simply produced, and thus, this structure is widely used. In order to display the warning phrase and a logo only when playback of a movie is initiated, a method of separately managing the warning phrase and the logo as a title and playing back a first program chain (PGC) is used, and each title is returned to a movie title using a navigation command at the end of a separate title.

A navigation command, i.e., a post command instructing each title to return to the main title, is recorded at the end of the main title. Thus, if the post command recorded at the end of the main title is played back, it is known that playback of the main title has terminated.

If playback of the main title is terminated, in operation S208, the disc is ejected by driving an unloading device.

Automatic ejection and the ejection time of the disc can be selected and adjusted using optional menus. That is, the user can select whether an operation of automatically ejecting the disc is performed by using a menu for setting an operational mode of a disc player. The user can also select the feature of automatic ejection of a disc, when playback of the disc has terminated, before and after playback of the title has terminated.

The method of automatically ejecting a disc in a disc player can be modified in various manners. For example, if playback of the main title is terminated, the termination of playback of the main title can be informed to the user by an alarm, in addition to, or instead of, ejecting the disc.

According to other aspects of the invention, a unit of the disc player is a computer implementing the methods shown in FIGS. 1 and 2 using data encoded on a computer-readable medium.

As described above, in the method of automatically ejecting a disc in a disc player according to an aspect of the present invention, if playback of a main title has terminated, the disc can be automatically ejected. Thus, the use of the method is convenient.

Although a few embodiments of the present invention have been shown and described, it would be appreciated by those skilled in the art that changes may be made in in this embodiment without departing from the principles and spirit of the invention, the scope of which is defined in the claims and their equivalents thereof.

What is claimed is:

1. A method of ejecting a disc from a disc player, the method comprising:
    selecting a main title from a plurality of titles recorded on the disc, the main title being the title having the longest playback time among the titles recorded on the disc;
    storing a playback time of the main title in a memory;
    determining whether the main title is playing or has played back;
    upon determining that the main title is playing or has played back, comparing a time since a beginning of the playing of the main title with a time stored in memory required for a complete playback of the main title and determining whether playback of the main title has terminated; and
    upon determining that playback of the main title is terminated, ejecting the disc by driving an unloading device.

2. The method according to claim 1, wherein a playback time of each title is determined by referring to respective program chain information.

3. The method according to claim 1, wherein the disc is a DVD.

4. The method according to claim 1, wherein whether the disc is to be automatically ejected can be specified by a user using a menu.

5. The method according to claim 4, wherein whether the disc is to automatically ejected is selectable both before playback and during playback.

6. A computer-readable medium encoded with processing instructions implementing a method of ejecting a disc from a disc player, the method comprising:
    selecting a main title from a plurality of titles recorded on the disc and storing a playback time of the main title in a memory, the main title being the title having a longest playback time among the titles recorded on the disc;

determining whether the main title is playing or has played back;

upon determining that the main title is playing, comparing a time since a beginning of the playing of the main title with a time stored in memory required for a playback of the main title and determining whether playback of the main title has terminated; and upon determining that playback of the main title is terminated, ejecting the disc by driving an unloading device.

7. The computer-readable medium according to claim 6, wherein the playback time of each title is determined by referring to respective program chain information.

8. A disc player for ejecting a disc, comprising:
a disc drive holding the disc,
an unloading device coupled to the disc drive;
a memory storing a time for playback of a main title recorded on the disc;
a determiner determining whether playback of the main title has terminated; and
a driver driving the unloading device ejecting the disc if the playback has terminated,
wherein the main title is the title having the longest playback time among titles recorded on the disc.

9. The disc player according to claim 8, wherein the determiner determines whether playback of the main title has terminated by comparing a time that has passed since a beginning of a playing of the main title with the time for playback stored in memory.

10. The disc player according to claim 9, wherein the playback time is calculated by referring to program chain information.

\* \* \* \* \*